Oct. 20, 1970 J. PAULL 3,534,595

CENTRIFUGAL TESTING APPARATUS

Filed May 29, 1968

INVENTOR
JACK PAULL

BY [signature]
ATTORNEY

United States Patent Office 3,534,595
Patented Oct. 20, 1970

3,534,595
CENTRIFUGAL TESTING APPARATUS

Jack Paull, Springfield, N.J., assignor to RCA Corporation, a corporation of Delaware Filed May 29, 1968, Ser. No. 733,182
Int. Cl. G01n 3/04
U.S. Cl. 73—103 7 Claims

ABSTRACT OF THE DISCLOSURE

A holder for securing and preventing deformation of a transistor package during centrifugal testing thereof. The holder comprises a cap, a plug, and a bushing. The transistor package has a lip which is engaged by bearing surfaces on the cap and bushing. The plug is coaxial with the bushing, and the bushing has longitudinal slots which cooperate with the plug to form a number of holes for receiving the package terminal leads.

BACKGROUND OF THE INVENTION

This invention relates to apparatus for the centrifugal testing of electrical components.

In the manufacture of semiconductor devices, the assembled component usually comprises a die of semiconductor material having one or more active elements formed therein, and a suitable package for containing, protecting, and electrically coupling the die to external circuitry.

A package commonly used for the housing of transistors and integrated circuits in that known as the "TO–5" type. This package comprises a metallic header having a number of terminal leads extending through and insulated from the header. Each of the leads terminates in a small post extending upwardly from the top surface of the header. A semiconductor die is bonded to the header top surface, and a number of fine interconnecting wires extend between the terminal lead posts and corresponding contact areas on the semiconductor die. A cover in the form of a thin walled metallic inverted, cup-shaped envelope surrounds the semiconductor die, interconnecting wires, and terminal lead posts. The cover has a peripheral lip which is bonded to the header.

A major factor affecting the performance of the completed semiconductor device is the reliability of the bonds between the interconnecting wires and the corresponding semiconductor die contact areas and header post terminations. It is therefore highly desirable to mechanically test the semiconductor device, preferably after the manufacturing process has been completed, to insure that the strength of the interconnecting wire bonds is adequate.

Since integrated circuits of the TO–5 type may have 8, 10 or 12 terminal leads, the testing of interconnecting wire bonds by independently stressing each bond is a slow, tedious and extremely expensive operation. In order to facilitate the testing of all interconnecting wire bonds simultaneously, techniques have been developed for the application of large centrifugal forces to the completed semiconductor device.

In order to insure sufficient reliability for high performance applications, such as military and space vehicle equipment, the application of centrifugal forces corresponding to accelerations on the order of 100,000*g* is often necessary.

At these extremely high accelerations, the force exerted between the semiconductor device and the centrifugal testing fixture often seriously mangles or completely destroys the device.

An object of this invention is to provide apparatus for the centrifugal testing of semiconductor devices without deforming said devices.

SUMMARY OF THE INVENTION

Testing apparatus includes a member having a recess adapted to receive a component housing. The member has an annular bearing surface for engaging a circumferential lip on the housing.

The testing apparatus also includes a generally cylindrical member having at least one recess for receiving the component terminal leads. The cylindrical member has an annular end bearing surface alignable with the bearing surface of the first mentioned member.

The apparatus includes means for disposing the electrical component between the aforementioned members so that each component terminal lead is disposed within the recess of the cylindrical member, and the circumferential lip of the component housing is disposed between the bearing surfaces of said members.

IN THE DRAWINGS

DETAILED DESCRIPTION

Figure 1:
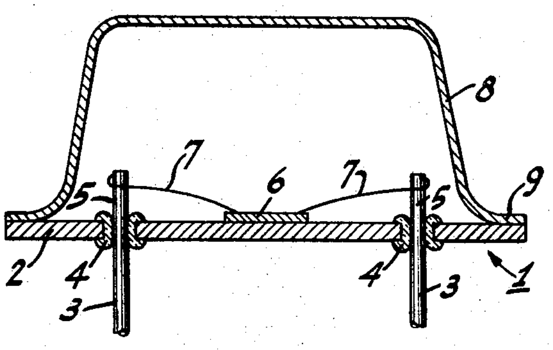
FIG. 1 shows an integrated circuit in a conventional TO–5 type package.

An integrated circuit component 1 of the TO–5 type, as shown in FIG. 1, comprises a metallic header 2 having a number of flexible terminal leads 3 extending downwardly from and substantially normal to the header. The terminal leads 3 are mechanically secured to and electrically insulated from the header 2 by glass seals 4. The upper ends of the terminal leads 3 extend above the upper surface of the header 2 to form corresponding posts 5. An integrated circuit semiconductor die 6 is secured to the header 2, so that the header serves as a heat sink for the die.

Flexible interconnecting wires 7 provide electrical connections between each of the posts 5 and corresponding contact areas on the exposed surface of the die 6.

A housing 8 comprising a thin walled metallic envelope, in cooperation with the header 2, encloses the semiconductor die 6, posts 5 and interconnecting wires 7. The housing 8 has a circumferential lip 9 which is secured to the header 2 by cold pressure welding, ultrasonic bonding or any other suitable techniques.

In order to apply stress to the interconnecting wires 7 for testing purposes, after the housing 8 has been assembled to the header 2, the integrated circuit component 1 is rotated at high speed so that centrifugal force stresses the bonds between the wires 7 and (i) the posts 5 as well as (ii) the contact areas on the semiconductor die 6.

Figure 2:
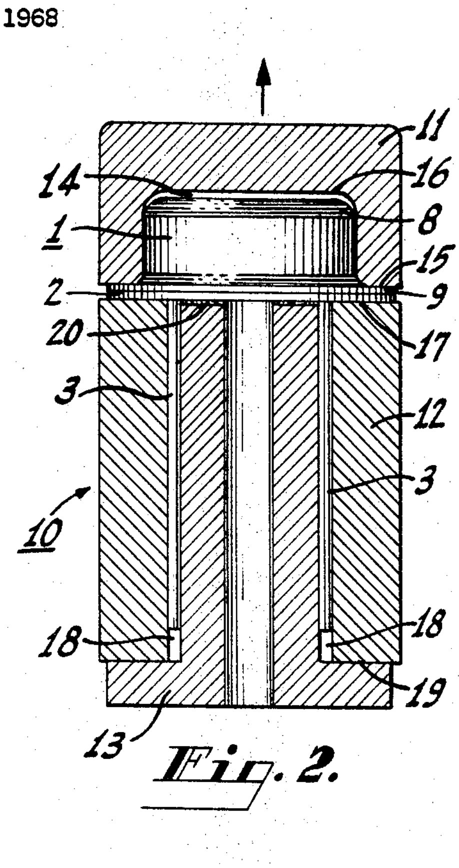
FIG. 2 shows a semiconductor device holding fixture according to the invention.

In order to hold the component 1 in position during this centrifugal testing step, without deforming the component, the holding fixture 10, shown in FIG. 2, is employed.

The holding fixture 10 comprises three pieces, viz., (i) a steel cap 11, (ii) an aluminum bushing 12, and (iii) an aluminum plug 13.

The cap 11 has a recess 14 therein which receives the housing 8 of the component 1. The cap 11 also has an annular ridge 15 which serves as a bearing surface for engaging the lip 9 of the housing 8. The cap 11 is dimensioned so that the bottom surface 16 of the recess 14 is slightly spaced from the upper surface of the housing 8. Typically, this spacing may be on the order of 0.002 inch. The proper clearance is provided by making the depth of the recess 14 slightly greater than the height of the housing 8 above its circumferential lip 9.

The terminal leads 3 of the component 1 are arranged in a generally circular array, each lead being substantially normal to the header 2.

The bushing 12 is cylindrical in form, and has an annular end bearing surface 17 which is in alignment with the peripheral ridge 15 surrounding the recess 14. The component 1 is engaged by the ridge 15 and the end bearing surface 17 at its circumferential lip 9, so that the component 1 is held in place only by forces exerted on the housing 8 and header 2 adjacent the circumferential lip 9.

Figure 3:
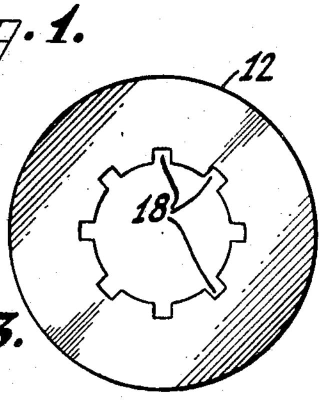
FIG. 3 is a plan view of one of the piece parts of the fixture shown in FIG. 2.

The inner surface of the bushing 12 has a number of longitudinal slots 18 formed therein, as shown in FIGS. 2 and 3. Alternatively, longitudinal slots may be provided in the outer surface of the plug 13 rather than the inner surface of the bushing 12. The outer surface of the plug 13 cooperates with the inner surface of the bushing 12 and the slots 18 to form a corresponding number of longitudinal holes for receiving the terminal leads 3. These holes closely surround the terminal leads 3, so that distortion of these leads is minimized during the centrifugal testing process.

Rather than providing individual longitudinal holes for receiving the terminal leads 3, the inner and outer surfaces of the bushing 12 and plug 13 respectively may be cylindrical and coaxial, with a space between these surfaces which is only slightly greater than the diameter of the terminal leads 3. The terminal leads 3 may be disposed in this cylindrical space, the close proximity of the inner and outer surfaces of the bushing 12 and plug 13, respectively, preventing distortion of the terminal leads 3 during the centrifugal testing process.

If desired, the bushing 12 and plug 13 may comprise a generally cylindrical unitary member, i.e., a single piece part.

The plug 13 has an outwardly extending ledge 19 at the lower end thereof. The ledge 19 engages the lower surface of the bushing 12, so as to prevent the movement of the upper end 20 of the plug 13 when the holding fixture 10 is subjected to centrifugal force. The header 2 is thereby prevented from mechanical distortion or destruction by the large force which would be exerted upon it if the upper end 20 of the plug 13 were permitted to move freely within the bushing 12.

The component 1 is assembled to the holding fixture 10 by first placing the housing 8 in the recess 14. Next, the bushing 12 is slipped over the terminal leads 3, and finally the plug 13 is inserted coaxially with the bushing 12.

The component 1 is then centrifugally tested by rotating the holding fixture 10 about an axis substantially parallel to the major surfaces of the header 2, so that a centrifugal force is exerted upon the holding fixture 10 and component 1 in the direction shown by the arrow in FIG. 2.

With the holding fixture 10 shown in FIG. 2, the test may be conducted at rotational accelerations on the order of 100,000*g* or more. At these acceleration levels, the terminal leads 3 tend to be deformed into corkscrews or helices. The terminal leads 3 therefore are preferably closely fitted with respect to the walls of the surrounding hole to prevent undesirable rotation or twisting of the leads.

The upper surface 16 of the recess 14 limits the deflection of the upper surface of the housing 8 under the large centrifugal force applied during the testing process. With a clearance on the order of 0.002 inch between the upper surface of the housing 8 and the adjacent surface 16 of the recess 14, the housing 8 is not stressed beyond its elastic limit, and regains its proper shape when the centrifugal force is removed.

The centrifugal force is applied in a direction substantially parallel to the terminal leads so that these leads exert substantial force upon the glass seals 4 of the header 2, thereby providing a mechanical test of the strength of the header structure itself.

The centrifugal force exerted in the direction indicated by the arrow in FIG. 2 urges the bushing 12 toward the cap 11 when the cap is retained in place by suitable means (not shown in FIG. 2). The net effect is that the ridge 15 of the cap 11 and the upper end bearing surface 17 of the bushing 12 engage the lip 9 of the component 1 in a vise-like grip to firmly hold the component and lock it in position without distorting the housing 8.

Figure 4:
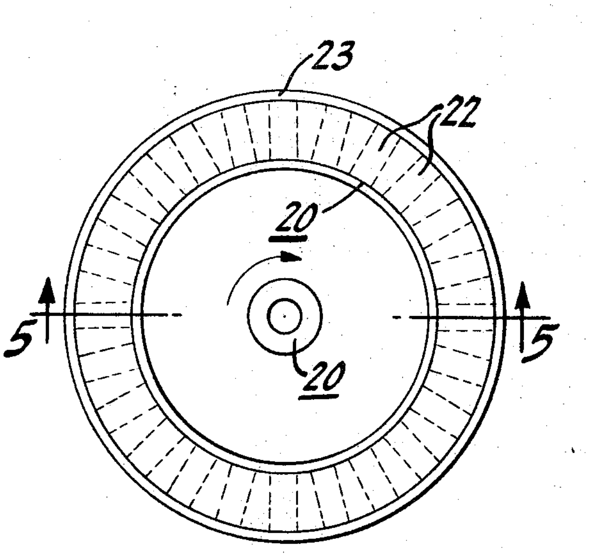
FIG. 4 is a plan view of a centrifugal testing structure which may be used in conjunction with the fixture of FIG. 2.
Figure 5:
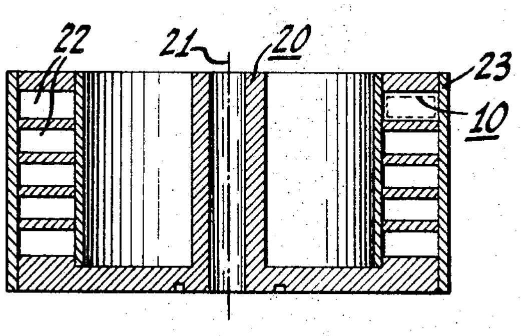
FIG. 5 is an elevation view of the testing structure shown in FIG. 4.

A suitable structure for simultaneously testing a large number of components 1, each component being held in a corresponding fixture 10, is shown in FIGS. 4 and 5. This centrifugal testing structure comprises a generally cylindrical holder 20 having a longitudinal axis 21 about which the structure 20 may be rotated.

A number of small radial cylindrical holes 22 are disposed about the periphery of the structure 20. The axis of each of the holes 22 is substantially normal to the longitudinal axis of the structure 20. Each of the holes 22 has a diameter slightly larger than the overall diameter of the holding fixture 10.

To test the components, each holding fixture 10, containing a corresponding component 1, is inserted into one of the holes 22, so that the cap 11 is furthest removed from the longitudinal axis 21. A cylindrical steel ring 23 is then slipped over the outer periphery of the structure 20 to retain radially outward movement of each of the caps 11.

The structure 20 is then rotated at high speed about the longitudinal axis 21 in order to apply radially outwardly directed centrifugal force to the components 1 to be tested.

I claim:

1. Apparatus for centrifugal testing of an electrical component, said component having (i) a header, (ii) a housing having a circumferential lip secured to the header, (iii) an electrical element within the housing, and (iv) a number of substantially parallel terminal leads extending from the header in a direction substantially normal to said header, comprising:

- a cap member having a recess adapted to receive said housing and an annular ridge surrounding said recess such that the lip of said housing engages said ridge;
- a generally cylindrical plug having an outer surface and uper and lower ends substantially normal to said surface, said plug having an outwardly extending ledge at the lower end thereof; and
- an annular bushing substantially coaxial with said plug, said bushing having an inner surface cooperating with the outer surface of said plug to form a corresponding number of longitudinal holes, each hole being adapted to receive and closely surround a corresponding one of said terminal leads;
- the upper end of said bushing comprising an annular bearing surface;
- said cap member being disposed in inverted relation with the upper end of said bushing, said cap member annular ridge and said bushing bearing surface being in alignment and sandwiching said housing lip therebetween, and means for retaining said cap member and said bearing in alignment;
- the lower end of said bushing engaging the ledge on said plug.

2. Apparatus for centrifugal testing of an electrical component, said component having (i) a header, (ii) a housing having a circumferential lip secured to the header, (iii) an electrical element within the housing, and (iv) a number of substantially parallel terminal leads extending from the header in a direction substantially normal to said header, comprising:

a cap member having a recess adapted to receive said housing and an annular ridge surrounding said recess such that the lip of said housing engages said ridge;

a generally cylindrical plug having an outer surface and upper and lower ends substantially normal to said surface, said plug having an outwardly extending ledge at the lower end thereof;

an annular bushing substantially coaxial with said plug, said bushing having an inner surface cooperating with the outer surface of said plug to form a corresponding number of longitudinal holes, each hole being adapted to receive and closely surround a corresponding one of said terminal leads;

the upper end of said bushing being adapted to engage said header in alignment with the periphery of said recess, the lower end of said bushing engaging the ledge on said plug; and a supporting member rotatable about an axis, said member having a generally cylindrical recess spaced from and normal to said axis for receiving said component, cap member, plug and bushing;

the upper end of said bushing and the periphery of said recess engaging said component at said lip with said holes receiving said terminal leads such that, upon rotation of said supporting member about said axis, a centrifugal force is developed in a direction substantially parallel to said terminal leads.

3. Apparatus for centrifugal testing of an electrical component, said component having (i) a header, (ii) a housing having a circumferential lip secured to the header, (iii) an electrical element within the housing, and (iv) a number of terminal leads extending from the header and electrically coupled to said element, comprising:

a member having a recess adapted to receive said housing and an annular bearing surface for engaging said circumferential lip;

a generally cylindrical member having a corresponding number of longitudinal holes adapted to receive said terminal leads and an annular end bearing surface alignable with the bearing surface of said first member; and means disposing said component between said members so that said terminal leads are disposed within said holes and said circumferential lip is disposed between said bearing surfaces, said means being rotatable about an axis substantially parallel to said bearing surfaces, said rotation imparting a centrifugal force to said members and said component in a direction normal to said bearing surfaces, said centrifugal force urging said bearing surfaces toward each other to retain said component in position by means of the force exerted by said bearing surfaces on said circumferential lip.

4. Apparatus according to claim 3, wherein said cap member is cup-shaped and said housing is generally cylindrical, said housing having an upper surface spaced from said header, the depth of said recess being slightly greater than the height of said housing above said circumferential lip, so that the bottom of said recess is slightly spaced from the top of said housing.

5. Apparatus according to claim 4, wherein said terminal leads are arranged in a generally circular array, each of said leads being substantially normal to said header.

6. Apparatus for centrifugal testing of an electrical component, said component having (i) a header, (ii) a housing having a circumferential lip secured to the header, (iii) an electrical element within the housing, and (iv) a number of substantially parallel terminal leads extending from the header in a direction substantially normal to said header, comprising:

a cap member having a cavity adapted to receive said housing and an annular ridge surrounding said cavity such that the lip of said housing engages said ridge;

a generally cylindrical plug having an outer surface and upper and lower ends substantially normal to said surface, said plug having an outwardly extending ledge at the lower end thereof; and an annular bushing having an inner surface cooperating with the outer surface of said plug to form a generally cylindrical recess between said inner and outer surfaces, said recess being adapted to receive and closely engage said terminal leads, the upper end of said bushing comprising an annular bearing surface;

said cap member being disposed in inverted relation with the upper end of said bushing, said cap member annular ridge and said bushing bearing surface being in alignment and sandwiching said housing lip therebetween, and means for retaining said cap member and said bearing in alignment;

the lower end of said bushing engaging the ledge on said plug.

7. Apparatus for centrifugal testing of an electrical component, said component having (i) a header, (ii) a housing having a circumferential lip secured to the header, (iii) an electrical element within the housing, and (iv) a number of terminal leads extending from the header and electrically coupled to said element, comprising:

a member having a cavity adapted to receive said housing and an annular bearing surface for engaging said circumferential lip;

a generally cylindrical member having a recess adapted to receive said terminal leads and an annular end bearing surface alignable with the bearing surface of said first member; and means disposing said component between said members so that said terminal leads are disposed within said recess and said circumferential lip is disposed between said bearing surfaces, said means being rotatable about an axis substantially parallel to said bearing surfaces, said rotation imparting a centrifugal force to said members and said component in a direction normal to said bearing surfaces toward each other to retain said component in position by means of the force exerted by said bearing surfaces on said circumferential lip.

References Cited

UNITED STATES PATENTS 2,626,667 1/1953 Spiller ______________ 279—41
3,293,402 12/1966 Graham __________ 279—41 X JERRY W. MYRACLE, Primary Examiner U.S. Cl. X.R.

73—94